(12) United States Patent
Delusky et al.

(10) Patent No.: US 6,964,802 B2
(45) Date of Patent: Nov. 15, 2005

(54) SURFACE FINISHING COMPRESSION MOLDING WITH MULTI-LAYER EXTRUSION

(75) Inventors: Arthur K. Delusky, Detroit, MI (US); Stephen McCarthy, Tyngsboro, MA (US); Robert V. Lucke, Cincinnati, OH (US); Thomas M. Ellison, Fort Mill, SC (US); Qing Guan, Lowell, MA (US)

(73) Assignee: The University of Massachusetts, Boston, MA (US)

( * ) Notice: Subject to any disclaimer, the term of this patent is extended or adjusted under 35 U.S.C. 154(b) by 0 days.

(21) Appl. No.: 10/865,995

(22) Filed: Jun. 11, 2004

(65) Prior Publication Data
US 2004/0224177 A1   Nov. 11, 2004

Related U.S. Application Data

(62) Division of application No. 10/077,285, filed on Feb. 14, 2002, now Pat. No. 6,770,230.
(60) Provisional application No. 60/284,344, filed on Apr. 17, 2001.

(51) Int. Cl.⁷ ................................................ B32B 5/12
(52) U.S. Cl. ....................... 428/113; 428/105; 428/107; 428/114; 428/212; 428/220; 428/327; 428/359; 428/364; 428/401; 428/300.7
(58) Field of Search ............................ 428/300.7, 361, 428/359, 334, 327, 328, 105, 107, 113, 114, 428/212, 220, 364, 401

(56) References Cited

U.S. PATENT DOCUMENTS

| | | | |
|---|---|---|---|
| 5,424,020 A | 6/1995 | Hara et al. | |
| 5,709,925 A * | 1/1998 | Spengler et al. | 428/198 |
| 6,119,750 A * | 9/2000 | Greve | 156/382 |
| 6,132,669 A | 10/2000 | Valyi et al. | |
| 6,287,678 B1 * | 9/2001 | Spengler | 428/297.4 |
| 6,506,334 B1 * | 1/2003 | Ellison et al. | 264/510 |
| 6,670,028 B2 * | 12/2003 | Ellison et al. | 428/300.7 |

FOREIGN PATENT DOCUMENTS

| | | |
|---|---|---|
| EP | 0 492 532 | 7/1992 |
| EP | 0 658 410 | 12/1993 |
| EP | 0 758 577 | 2/1997 |
| EP | 0 887 168 | 12/1998 |
| WO | WO 02/064436 | 8/2002 |

* cited by examiner

Primary Examiner—Merrick Dixon
(74) Attorney, Agent, or Firm—Bachman & LaPointe, P.C.

(57) ABSTRACT

The compression molded article includes an outer plastic film layer, a first plastic layer adhered to the outer plastic film layer and a second plastic layer adhered to the first plastic layer. Long fibers having a length of from 8 to 100 mm are admixed with the second plastic layer. The article is formed by compression molding.

10 Claims, 2 Drawing Sheets

SURFACE FINISHING COMPRESSION MOLDING WITH MULTI-LAYER EXTRUSION

CROSS-REFERENCE TO RELATED APPLICATION

The instant application is a divisional application of U.S. patent application Ser. No. 10/077,285 filed Feb. 14, 2002, now U.S. Pat. No. 6,770,230, which claims the benefit of U.S. Provisional Application Ser. No. 60/284,344, filed Apr. 17, 2001.

BACKGROUND OF THE INVENTION

In accordance with U.S. Pat. No. 5,401,457 for PROCESS FOR FORMING A COLOR COATED ARTICLE, By Emery I. Valyi, Patented Mar. 28, 1995, a process is provided for forming a color coated article. In accordance with the '457 patent, a film is placed substantially flat over a mold cavity and deformed by a core mold half and by molten plastic entering through a sprue.

An alternate method consists of thermoforming the film to nest accurately in the mold cavity, with said operation being carried out independently of the mold. The formed film insert is then brought to the mold and placed into the cavity. This procedure is described by Ch. Fridley, Avery Dennison, in Product Finishing, Apr. 19, 1992, and European Patent 0,442,128 to Beyer, and other publications. The Avery procedure entails a forming process of the film that is well known and widely practiced for other uses. It is a low pressure process for shaping the film or sheet, in solid condition, at relatively low temperatures. This holds for all of the several variants of thermoforming, such as vacuum forming, whether the vacuum is to suck the film into the cavity, or onto the core, as well as thermoforming followed by a sizing operation.

The result of this is a product whose dimensional accuracy and shape conformance is not within the range of a high pressure forming process, such as injection molding or compression molding. Consequently, the thermoformed preform, while nesting in the mold cavity or slipped over the core, fails to conform to them fully. Thus, upon injecting or compressing plastic behind the preform, the preform will deform producing localized surface imperfections. These imperfections may be dimensionally insignificant but optically discernible and therefore may provide a product of insufficient quality for an automotive finish, for example. In addition, the cost of a separately made film insert is relatively high, considerable trim scrap is generated, and the handling (transport, destacking, insertion) become expensive.

The procedure of the '457 patent overcomes the above defects; however, it is difficult to control, particularly when molding parts with large surfaces and sharply varying curvature. The difficulties increase when the plastic is pressure molded at high enough temperatures to reduce the film strength substantially, as in the case of conventional injection molding.

In applying either of the above processes to large, panel-like structures, it was found, moreover, that the procedure of injection molding of the '457 patent and Avery Dennison procedure referred to above, is difficult to carry out, requiring extremely costly equipment, and prone to produce imperfections at the interface between the film layer and the injected plastic.

U.S. Pat. No. 6,132,669 to Valyi et al. describes a new and advantageous procedure for efficiently molding plastics and incorporating reinforcement layers into the molded products, as well as describing improved products. Long glass fibers, e.g., 8 to 25 mm in length, have been found to improve the physical properties of injection molded plastics as well as products molded in accordance with the aforementioned U.S. Pat. No. 6,132,669. These are particularly advantageous for the automotive industry. Unfortunately, however, the surface appearance of parts molded with long glass fibers is often degraded.

Injection molding is the prior art method generally employed to mold parts with long glass fibers, that is for example with fibers longer than 8 mm and generally from 8 to 25 mm. The physical properties, notably tensile strength and flexural modulus, for parts molded with long glass fibers are significantly improved over conventional molding using short glass fibers, i.e., fibers less than 8 mm in length. However, the main benefits of using the long glass fibers is not achieved with injection molding because many if not most of the long glass fibers are broken by the shear forces of injection molding and the fact that fiber orientation varies with location in the part. Variable fiber orientation creates molded parts with non-uniform properties, which is disadvantageous. Fibrous additives in general tend to degrade the appearance of the part surface, particularly in class A surfaces. Also, the degree of appearance degradation increases with increasing fiber diameter and length. Fiber "read through" from long fibers is a serious limitation on the use of the advantageous long fibers for appearance of the parts molded with the long fibers. This seriously limits the use of the long fibers.

There is, therefore, a need for and it is an object of the present invention to provide an improved process and molded article which advantageously uses long fibers in molded products with minimum fiber breakage and with minimum to no fiber read through at the surface of the molded product.

SUMMARY OF THE INVENTION

In accordance with the present invention, the foregoing objectives are obtained and an improved process and molded article provided which advantageously uses long fibers in molded products with minimum fiber breakage and with minimum to no fiber read through at the surface of the molded product.

The present invention is an improvement over U.S. Pat. No. 6,132,669, the disclosure of which is incorporated herein by reference.

In accordance with the present invention, a first plastic resin is deposited on a surfacing film. The first resin may include fine or very fine particle sized filler. A second plastic resin is then deposited on the first resin. The second resin contains the desired long fibers, e.g., glass, carbon, metal, natural, etc. The actual fiber length for the long fibers is from 8 mm to 100 mm and preferably from 8 to 25 mm, i.e., it is a length greater than that at which objectionable surface degradation occurs when the second resin is deposited as the first layer.

A third resin, which may be similar to or identical to the first or second resin, is then desirably deposited onto the second resin. The third resin preferably has shrinkage properties similar to the first resin. The third resin desirably counters any warpage that may occur due to differential shrinkage between the first and second layers.

The resultant layers are molded desirably by compression molding in accordance with the procedure in the aforesaid U.S. Pat. No. 6,132,669, although other molding processes may be used.

It has been found that the foregoing results in an improved process and an improved molded article. The desirable long fibers are readily used, thus obtaining the significant advantages thereof as discussed above, without read through and with minimal to no fiber breakage. Moreover, the procedure is convenient, inexpensive and expeditious and effectively forms molded parts, as for example for colored automotive or appliance parts.

Further features and advantages of the present invention will appear hereinbelow.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Figure 1:
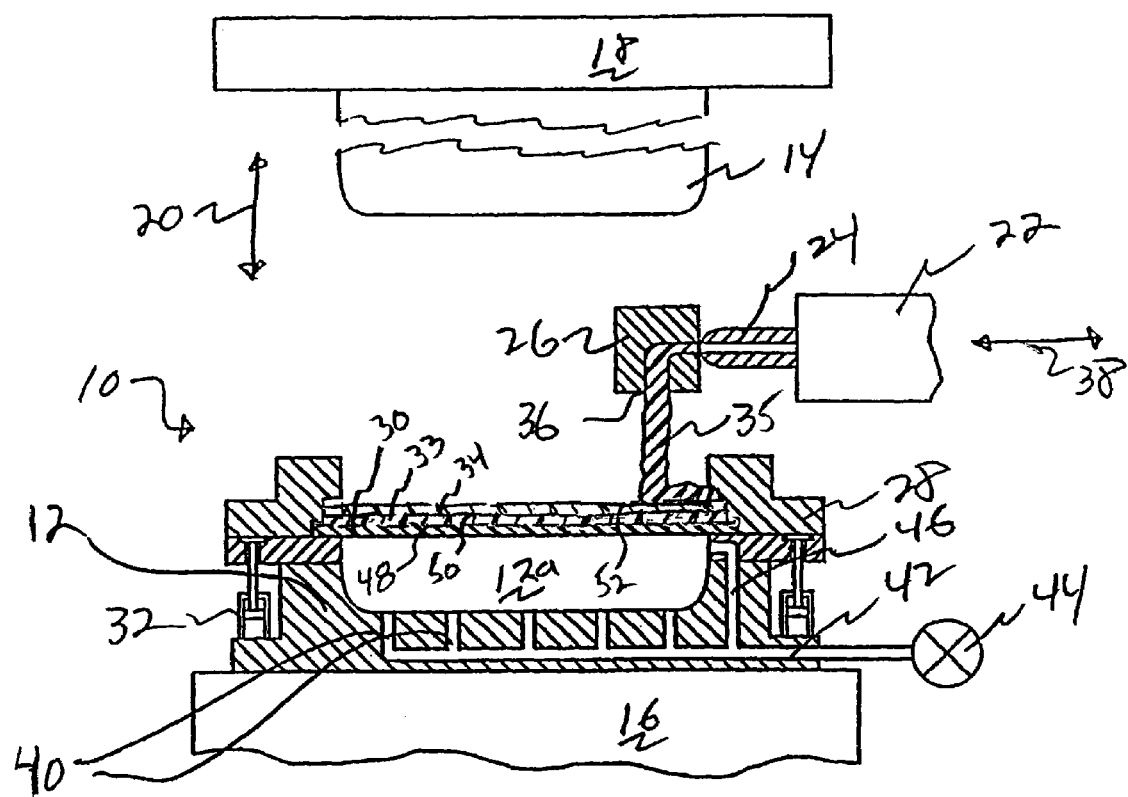
FIG. 1 is a partly schematic view of the method of the present invention in an early stage of the preparation of the molded article of the present invention.

A variety of plastic materials may be used for the first, second and third layers. Similarly, the film may be any desired film and may desirably be a colored film to obtain a colored product.

The film or blank is preferably plastic, and any desired plastic material may be used for the film material, for example, polyolefins, polyvinyl chloride, polystyrene, polycarbonates, etc. The film may be cut or stamped from a web and a supply of films having the size and shape to fit over mold cavity maintained adjacent the mold for transfer to the mold. The film is preferably colored and the depth of color may naturally be varied depending on needs. Since the film is the outermost layer, this will provide a colored, molded article. One should naturally consider the thinning of the film during processing and adjust the color depth to the amount of deformation any given portion of the film is to undergo. Thus, for example, thicker paint coatings may be applied to selective film locations that are to obtain greater deformation during processing in order to obtain uniformity of color in the final molded product. The film may, for example, be intaglio printed. The film may be applied to the mold with robot means or removably adhered to a carrier film strip. The carrier film strip may be provided with means to register the position relative to the mold half onto which the films are to be placed, e.g., edge perforations. The carrier, with the films attached, may then be supplied from a roll. Once the film and mold are juxtaposed, suction may be applied to the edge of the film by the mold, as through channels, sufficient to separate the film from the carrier strip. Naturally, other transfer means may readily be used.

Any suitable plastic material may be used for the first, second and third plastic layers. Desirably, thermoplastic polyolefin plastics are employed, as polypropylene polymers or copolymers, polyethylene polymers or copolymers, etc. Alternatively, one can use acrylonitrile-butadiene-styrene (ABS) polymers, polycarbonate polymers or copolymers, etc. The first, second and third resins may be the same or different, depending on particular requirements.

Also, if desired, the first deposited plastic layer may be compounded with fine or very fine particulate additives to obtain a balanced shrinkage with the second layer, such as fine fibers having a length less than 6 mm, desirably less than 3 mm, as from 1–3 mm. Additionally, reinforcing mats or scrims of woven or non-woven material may if desired be placed between any of the deposited layers, as taught in U.S. Pat. No. 6,132,669. The multiple layers may be extruded from one extrusion die cavity, from sequential die cavities, or by sequential deposits from one die. In the latter case, surface shells may first be made with the first resin. The resin is then changed to the second resin including the long fibers. Shells of the first resin may be placed in the mold cavity and the second resin including the long fibers is deposited thereon, followed by a third layer if desired, and the mold is closed to form the desired part by compression molding.

Naturally, other means of resin deposit may be used provided that the first resin is first deposited, followed by the second resin deposit including the long fibers therein, and followed by the third resin if used. These resins are desirably deposited onto the film, which is desirably a colored film, while the film is over the mold cavity. The various resins may be deposited onto film while the film is over the mold cavity in compression molding press. Alternatively, the resins may be deposited on the film at a location spaced from the mold and the laminate delivered to the mold cavity. A further alternative would be to deposit the resins on the film and on the mold cavity at a location spaced from the compression press, and then shuttle the components and mold cavity into the compression press for molding the final part.

The long fibers are admixed with the second resin so that the second resin contains the long fibers admixed therein, preferably uniformly dispersed throughout the second resin. The third resin, if desired, may include the long fibers as in the second resin or short fibers as in the first resin.

A series of experiments was performed using a film finish, first and second resin layers as above with long fibers in the second layer. An 800 ton compression molding machine was employed and a paint finish film was used. The fibers were long glass fibers 10–11 mm in length or a 50/50 blend of carbon and glass fibers in polypropylene-fiber length about 13 mm. The molded part was an automotive door panel. No surface degradation occurred due to the long fibers and no fiber breakage was determined. The multi-layer parts exhibited much greater stiffness when compared to controls molded with only talc filled resin. Surface degradation due to the long fiber resins was prevented by the first resin deposit.

It was further determined by oxidizing away the polymer resin that the long fibers were not degraded in length during the extrusion process. Also, the outer layer of fibers was oriented in the direction of extrusion flow, but the center bulk of fiber was randomly oriented. The random orientation is desirable for uniform properties at substantially all locations in the molded part. This is contrary to injection molding of long fibers where a high percentage of the fibers are severely degraded.

Referring to the drawings, FIG. 1 shows a mold 10 consisting of a female mold or cavity half 12 with mold cavity 12a therein and core half 14 mounted on respective platens 16 and 18. Mold cavity 12a has a shape of the desired molded article, in this case a curved member, as shown. Naturally, other desired shapes can readily be formed. At least one of the cavity half and core half is reciprocable in the direction of arrow 20 from an open to a closed position and from a closed to open position.

An extruder/injection unit 22 having a nozzle 24 is arranged adjacent mold 10 to coact with a so-called coat hanger die 26, which serves as a hot plastic delivery plate.

A hold down and spacer frame 28 is aligned with cavity half 12 and holds outer plastic film 30 over cavity half 12. The frame 28 is engageable with and detachable from cavity half 12 and is coupled with means to move same (not shown) towards and away from cavity half 12 independently of the reciprocal movement of core half 14. Thus, a pair of lift cylinders 32 may be mounted on either platens 16 or 18, with mounting on platen 16 being shown in FIG. 1.

Thus, in accordance with the embodiment of FIG. 1, die 26 serves as a hot plastic delivery plate, depositing first plastic layer 33 via slit opening 36 on the entire upper or inner surface 48 of film 30, followed by depositing second plastic layer 34 on the upper or inner surface 50 of the first plastic layer 33, followed by depositing the third plastic layer 35 (if used) on the upper or inner surface 52 of the second plastic layer 34. The extruder 22 and die 26 are reciprocable in the direction of arrow 38 towards and away from mold 10. In operation, the blank or film 30 having been placed over the mold cavity 12a and clamped down as by spacer frame 28, the extruder 22 and die 26 are traversed over blank 30 and the desired layers of hot plastic are deposited thereover. The thickness of the plastic layers is given by the speed of traverse, the output of the extruder and the dimensions of the die, all controlled in a conventional manner. At the end of the deposits, the extruder is shut off and returned to its starting position. One may provide an extruder with width and/or thickness control to control the thickness and/or width of the plastic layer. The speed of traverse and/or the output of the extruder could be variable. The positioning of the extruder in the X, Y and Z planes could be variable to vary the dimensions and/or configuration of the plastic layer.

If desired, fluid pressure may be applied to mold cavity 12a under blank 30, as through channels 40 connected through a joint manifold 42 with pressure control means 44. The fluid usually used is air, but may also be an inert gas if the material of blank 30 so requires. Alternatively, fluid pressure may be applied through channel 46 in cavity half 12 directly beneath film blank or film 30 in order to properly hold the film in place. Preferably, a plurality of locations, or a continuous channel, are provided around the circumference of the film directly beneath the film. Also, these may be valved separately from channels 46 or used instead of channels 40.

After deposition of the plastic layers on film 30, the extruder 22 and die 26 are moved away from between core 14 and cavity half 12. The resultant laminate of film 30 and deposited plastic layers is then compression molded by interaction of core 14 and cavity half 12 to form the resultant compression molded article of the present invention.

The embodiment of FIG. 1 is representative only and a wide variety of alternate procedures may be utilized to form the compression molded article of the present invention. For example, those procedures described in U.S. Pat. No. 6,132, 669 may be readily employed. Alternatively, the laminate of film 30 and plastic layers may be formed at a separate location and brought to mold 10 after assembling the film and plastic. As a further alternative, preformed plastic sheets may be used instead of a deposited hot plastic as shown in FIG. 1. If this procedure is employed, the laminate or assembly is desirably heated prior to compression molding.

If desired, the deposited plastic layers may be a co-extruded or a sequentially deposited multi-layer. Multi-layer molding resins may include tie layers or adhesive layers to bond dissimilar resin layers together in the molding resin deposit. The deposited molten resin would bond to the film and heat the film for forming. After the part is formed, any desired inserts or other components may be attached to the inside layer.

Figures 2, 3:
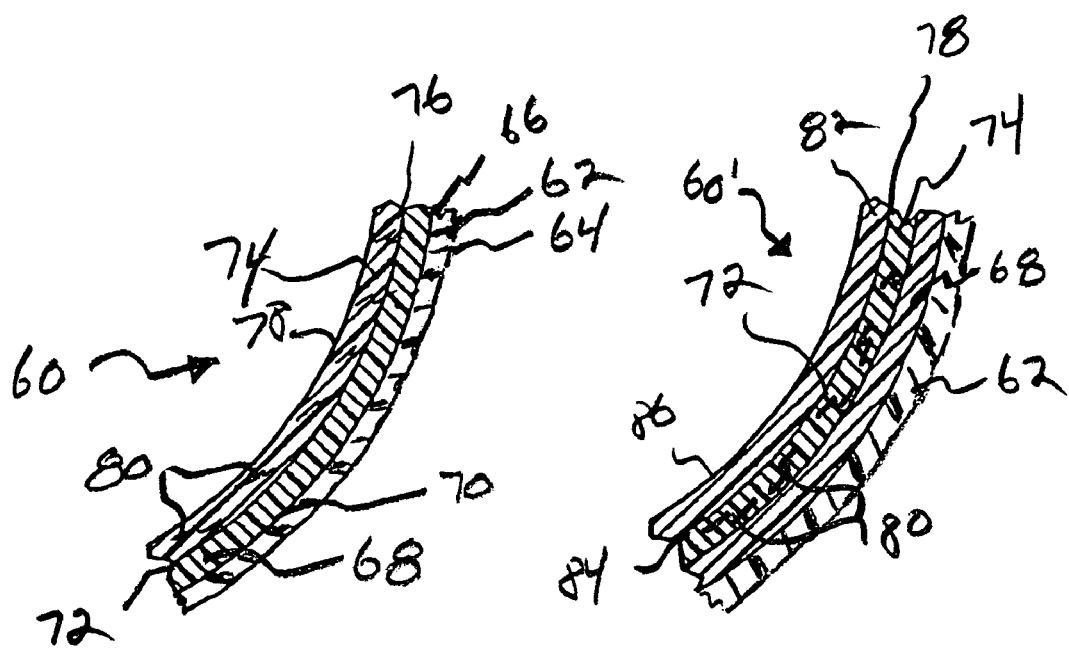
FIGS. 2–3 are partial sectional views showing different embodiments of the layered wall structure of the molded article of the present invention.

FIGS. 2 and 3 show partial sectional views of different wall structures which may be readily prepared in accordance with the present invention.

FIG. 2 shows a portion of compression molded article 60 with outer plastic film layer 62 having an outer surface 64 and an inner surface 66. Outer surface 64 is generally the outermost surface of the molded article, although additional materials may be provided on the outer surface 64. First plastic layer 68 has an outer surface 70 and an inner surface 72 with the outer surface 70 adhered to the inner surface 66 of outer plastic film 62. Second plastic layer 74 has an outer surface 76 and an inner surface 78 with the outer surface 76 adhered to the inner surface 72 of the first plastic layer 68. The second plastic layer 74 contains long fibers 80 as discussed hereinabove admixed throughout the second plastic layer. In accordance with the present invention, the long fibers 80 provide considerable improvement in the compression molded article of the present invention without fiber read through on the outer surface 64 of outer plastic film layer 62.

In accordance with the embodiment of FIG. 3, compression molded article 60' is provided with outer plastic film layer 62, first plastic layer 68 and second plastic layer 74 as shown in FIG. 2, with long fibers 80 admixed throughout the second plastic layer. However, the embodiment of FIG. 3 includes third plastic layer 82 having an outer surface 84 and an inner surface 86 with the outer surface 84 adhered to the inner surface 78 of the second plastic layer 74.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope.

What is claimed is:

1. A molded article, which comprises: an outer plastic film layer having an outer surface and an inner surface; a first plastic layer having an outer surface and an inner surface, with the outer surface of the first plastic layer adhered to the inner surface of said outer plastic film; a second plastic layer having an outer surface and an inner surface, with the outer surface of the second plastic layer adhered to the inner surface of the first plastic layer; wherein the second plastic layer contains admixed long fibers which are uniformly dispersed throughout the second plastic layer and have a length of from 8 to 100 mm, wherein at least a portion of the long fibers in the second plastic layer are randomly oriented, and wherein said article is compression molded into a compression molded, shaped article.

2. An article according to claim 1, wherein said fibers have a length of from 8 to 25 mm.

3. An article according to claim 1, including a third plastic layer having an outer surface and an inner surface, with the outer surface of said third plastic layer adhered to the inner surface of the second plastic layer.

4. An article according to claim 1, wherein the film is colored.

5. An article according to claim 1, wherein the film is selected from the group consisting of polyolefins, polyvinyl chloride, polystyrene and polycarbonates.

6. An article according to claim 1, wherein the first and second layers are selected from the group consisting of polyolefins, acrylonitrile-butadiene-styrene polymers, and polycarbonates.

7. An article according to claim 3, wherein said third layer is selected from the group consisting of polyolefins, acrylonitrile-butadiene-styrene polymers, and polycarbonates.

8. An article according to claim 1, wherein said first plastic layer includes fibers having a length less than 6 mm.

9. An article according to claim 1, wherein said fibers are selected from the group consisting of glass fibers, carbon fibers, metal fibers, natural fibers and mixtures thereof.

10. An article according to claim 8, wherein the fibers in the first layer are selected from the group consisting of glass fibers, carbon fibers, metal fibers, natural fibers and mixtures thereof.

* * * * *